United States Patent
Feder et al.

(12) 
(10) Patent No.: US 6,528,580 B1
(45) Date of Patent: Mar. 4, 2003

(54) AQUEOUS SILICONE DISPERSION, CROSSLINKABLE INTO TRANSPARENT ELASTOMER

(75) Inventors: Michel Feder, Villeurbanne (FR); Yves Giraud, Sainte Foy les Lyon (FR); Marcel Guironnet, Oullins (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/719,778

(22) PCT Filed: Jun. 15, 1999

(86) PCT No.: PCT/FR99/01435

§ 371 (c)(1),
(2), (4) Date: Mar. 5, 2001

(87) PCT Pub. No.: WO99/65973

PCT Pub. Date: Dec. 23, 1999

(30) Foreign Application Priority Data

Jun. 18, 1998 (FR) .............................. 98 07875
Feb. 12, 1999 (FR) .............................. 99 01955

(51) Int. Cl.$^7$ .............................. C08L 83/04
(52) U.S. Cl. .................. 524/801; 524/858; 524/261; 524/492; 525/474; 528/34; 528/12
(58) Field of Search ................. 524/801, 858, 524/261, 492; 525/474; 528/34, 12

(56) References Cited

U.S. PATENT DOCUMENTS 3,996,189 A  12/1976  Travnicek et al.

FOREIGN PATENT DOCUMENTS

| EP | 0 542 498 | 5/1993 |
| EP | 0 739 929 | 10/1996 |
| FR | 2 377 438 | 8/1978 |
| WO | 97 47687 | 12/1997 |

*Primary Examiner*—Robert Dawson
*Assistant Examiner*—Kuo-Liang Peng
(74) *Attorney, Agent, or Firm*—Burns, Doane, Swecker & Mathis, L.L.P.

(57) ABSTRACT

The present invention is directed to an aqueous silicone dispersion capable of being crosslinked into a transparent elastomer comprising: 1) a silicone phase comprising at least one crosslinkable polyorganosiloxane A, optionally at least one silicon-containing adhesion promoter B, optionally at least one crosslinking agent D, and optionally at least one solvent $S_a$ of the crosslinkable polyorganosiloxane A, 2) a non-silicone hydrophilic phase comprising at least one filler, a surfactant, and optionally at least one catalyst and/or at least one water soluble adhesion promoter B', and 3) water; wherein the difference between the refractive indexes of component 1) and component 2) is not greater than 0.05, preferably not greater than 0.04. The invention also concerns the method for preparing said dispersion and the sealant or other materials or waterproofing/fireproofing coats comprising said dispersion.

19 Claims, 1 Drawing Sheet

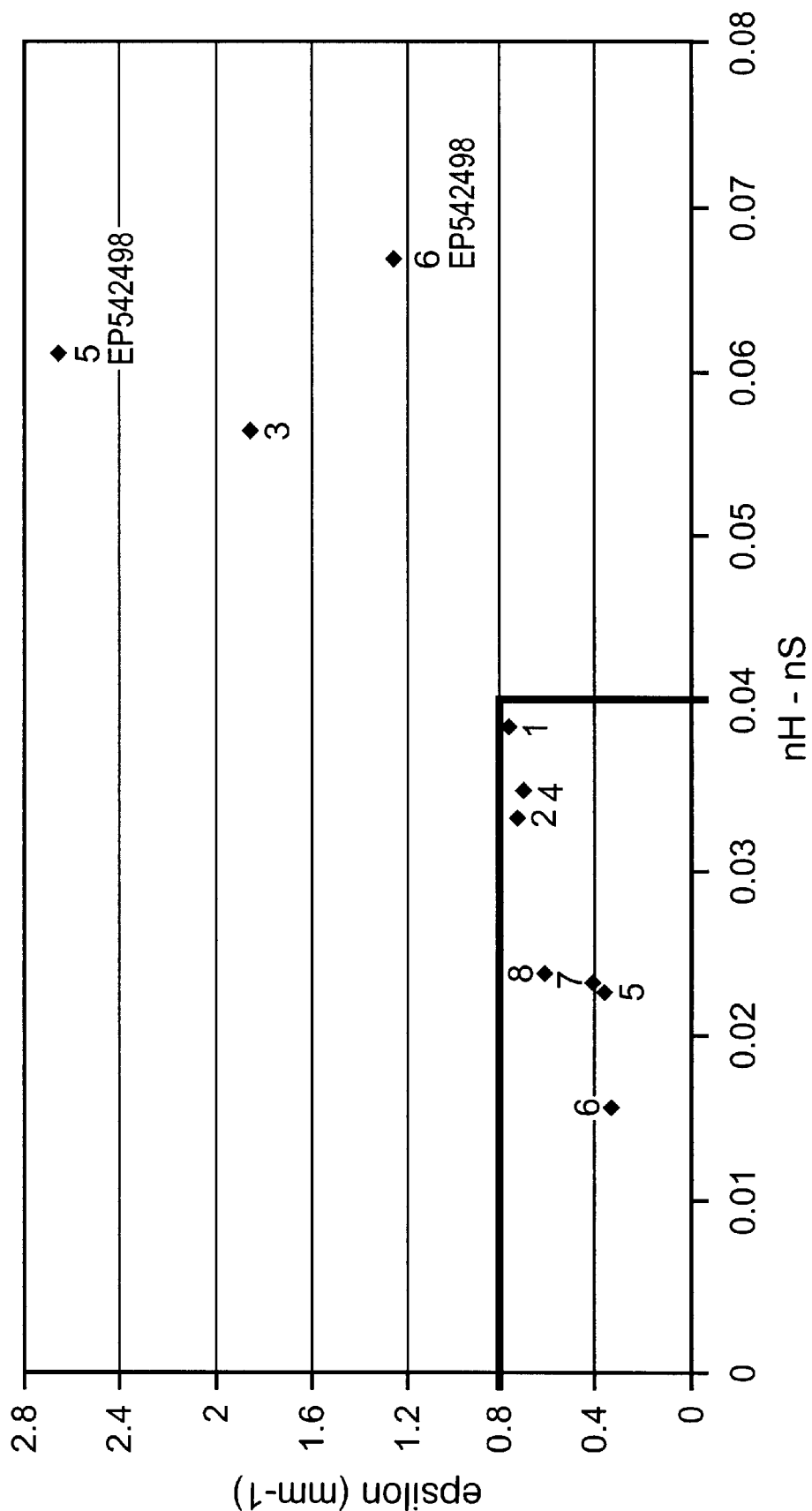

AQUEOUS SILICONE DISPERSION, CROSSLINKABLE INTO TRANSPARENT ELASTOMER

The field of the present invention is that of silicone compositions which can be cured by crosslinking and which can be used in particular either as mastics or other leakproofing and/or water-repelling and/or pointing materials or alternatively to form coatings of any type (for example paints), including in particular flexible coatings of medium thickness. More specifically, the invention relates to an aqueous silicone dispersion capable of forming, by crosslinking (e.g. polycondensation) accompanied by elimination of water (preferably at room temperature), a transparent elastomer which adheres to numerous substrates. Without this being limiting, the crosslinking mechanism more especially envisaged for the conversion of the silicone, as an aqueous dispersion, to a transparent and adhesive elastomer is of the type involving hydrolysis/condensation of $\equiv SiOR^a$ reactive groups with $R^a$=H or alkyl. The silicones or polyorganosiloxanes (POS) which come within such a context are in particular $\alpha,\omega$-dihydroxylated polydiorganosiloxanes, such as, for example, $\alpha,\omega$-di-OH polydimethylsiloxanes. In addition to this main constituent, which is a POS, aqueous silicone dispersions which are precursors of mastics or other leakproofing/water-repelling coatings optionally comprise adhesion promoters, for example silicon-comprising adhesion promoters (silanes, oligo- or polyorganosiloxanes), and optionally crosslinking agents of the trialkoxysilane type or polyfunctional resins comprising several $\equiv SiOR^a$ functional groups. All these silicon-comprising constituents, when they are not hydrophilic or water-soluble, compose the non-continuous phase (silicone phase $\phi_s$) of the aqueous silicone dispersion.

Aqueous silicone dispersions which are precursors of mastic, leakproofing/water-repelling or pointing materials, or of coatings form one of the latest generations of silicone compositions employed in this technical field. Their aqueous nature facilitates handling operations, shaping operations and the washing of the tools used for their application. These aqueous silicone dispersions also exhibit the advantage of a lower toxicity with respect to silicone compositions comprising organic solvents or which release volatile organic species.

The hydrophilic phase $\phi_H$ (non-silicone phase) of these aqueous dispersions based on silicone oil which can be crosslinked into an elastomer by (hydrolysis)/condensation with elimination of water and/or alcohol, for example, is continuous and comprises hydrophilic constituents, such as, for example, fillers (e.g. siliceous fillers) and surfactants. This hydrophilic phase $\phi_H$ can additionally comprise an adhesion promoter also capable of acting as crosslinking agent.

These compositions also comprise a condensation catalyst.

These aqueous dispersions of hydroxylated silicone oil can be produced conventionally by mechanical stirring or alternatively by emulsion polymerization.

The conventional method consists in employing devices of colloid mill or homogenizer type (FR-A-2 064 563, FR-A-2 114 130, FR-A-2 094 322 and EP-A-0 169 098). This technique is limited to the emulsification of polymers with a viscosity of less than 5 000 mpa.s. It is possible to mechanically emulsify more viscous oils, for example by using the techniques disclosed in FR-A-2 697 021.

It is also possible to use the technique of emulsion polymerization of cyclic or linear silicone oligomers of low molecular weight which are easy to emulsify according to conventional mechanical techniques. In this alternative, it is preferable for the surfactants also to act as polymerization catalysts (U.S. Pat. Nos. 3,294,725 and 3,360,491).

Although representing a degree of technical progress, these aqueous silicone dispersions which are precursors of mastics and/or of leakproofing/water-repelling coatings have a specification sheet, the specifications of which can be further improved. These improvable specifications are:

- the stability on storage,
- the excessively long curing time,
- the mechanical properties of the elastomer (hardness, elasticity, resistance to abrasion),
- the "flowability" of the elastomer,
- the possibility of painting the elastomer,
- the properties of cohesion and of adhesion of the elastomer to conventional substrates,
- the problems of safety and of toxicity due to the solvents or to the alcohols formed by hydrolysis,
- and the ease of use.

In the context of the invention, another specification of a more aesthetic nature but which is not without technical repercussions will also be included, namely the translucency or the transparency of the elastomer obtained after at least partial crosslinking of the aqueous silicone dispersion with elimination of water or alcohol. This transparency corresponds to a market requirement which is more particularly felt for silicone mastics.

Some proposals of the prior art have attempted to satisfy, in vain, the specification sheet which is defined above and which relates in particular to transparent aqueous silicone mastics.

European Patent Application EPA-0 542 498 relates to aqueous silicone emulsions which can be converted by crosslinking and drying into a translucent elastomer. These emulsions comprise crosslinked polydimethylsiloxane (PDMS), which is provided in the form of a dispersed phase in which less than 10% of the particles have a size of greater than 1 000 nm. This PDMS is obtained by anionic emulsion polymerization.

This emulsion also comprises a surfactant of formula $RSO_4M$ of the sodium lauryl sulphate type. The nondisperse aqueous phase of this emulsion comprises a crosslinking agent of the alkoxysilane type ($\gamma$-methacryloxypropyl, trimethoxysilane chloropropyltrimethoxysilane, trifluoropropyltrimethoxysilane or vinyltrimethoxysilane) and a filler composed, for example, of precipitated silica with a particle size of the order of 19 nm and of colloidal silica for which the size of the particles is approximately 20 nm. This nondisperse continuous aqueous phase also comprises a condensation catalyst of the tin octoate type.

In Example 5 of EP-A-0 542 498, the translucency obtained for the elastomer resulting from the aqueous silicone emulsions is of the order of 85% of Transmission T for a dry crosslinked elastomer film of 47 mil (1.519 mm).

The transmission T is defined according to the Lambert-Beer law:

$$\log(100/T) = \epsilon \cdot e \cdot C$$

with:
T=transmission varying from $0 < T \leq 100\%$ of a film with a thickness e irradiated with white light with a wavelength $\gamma$ of between 400 and 700 nm,
$\epsilon$=coefficient of extinction ($mm^{-1}$),
e=thickness of the dry film (mm), C=total fraction by volume of the non-silicone hydrophilic species in the dry film.

The translucency can be expressed by the transparency index R in %=100-T.

According to the teaching of EP-A-0 542 498, the translucency decreases when the level of silicic filler increases (page 11, line 44). It should be noted that, in accordance with the invention disclosed in EP-A-0 542 498, the achievement of an all things considered improvable translucency is dependent on the presence in the dispersed phase of at least 90% of silicone particles with a size of less than 1 000 nm. The invention disclosed in EP-A-0 542 498 is consequently based on the fineness of the silica particles.

The transparency index R of the crosslinked elastomer films obtained according to EP-A-0 542 498 is greater than 25%. In addition, the coefficient of extinction ε of these films is greater than 0.8 mm$^{-1}$.

In addition, the emulsions according to EP-A-0 542 498 are restricted to those comprising a specific surfactant of the sodium lauryl sulphate type.

If the refractive index $n_S$ of the dispersed silicone phase $\phi_S$ and the refractive index $n_H$ of the non-silicone continuous hydrophilic phase $\phi_H$ of the aqueous silicone emulsions according to EP-A-0 542 498 are considered, it is apparent that $|n_S-n_H|>0.05$. Such a $|n_S-n_H|$ range reflects an unsatisfactory translucency for the crosslinked elastomer (ε>0.8 mm$^{-1}$).

Patent Application EP-A-0 739 929 discloses aqueous dispersions of polyorganodisiloxanes of the polydimethylsiloxane type which can be crosslinked into an elastomer having improved properties of stability to temperature and of transparency. According to this application, these advantages are obtained by virtue of the choice of specific surfactants, which are not alkyl sulphates, linear alkylbenzenesulphates, alkylsulphonates nor laurates. The surfactants must not behave as redistribution catalysts for siloxanes at temperatures of greater than 100° C. Finally, the surfactants must be such that, after evaporation of the water from the silicone aqueous silicone dispersion (latex), the resulting elastomer composition comprises a crosslinked POS phase $\phi_S$ with a refractive index $n_S$ and a residual aqueous phase (comprising the surfactants) with a refractive index $n_H$, $n_H$ being the same as $n_S$.

This silicone latex is obtained by emulsifying the silicone phase/surfactant/water mixture. This results in a gelled phase with a content of silicone polymer of at least 85%. The emulsion is subsequently diluted with water. A catalyst is incorporated before or after the emulsification or before or after the dilution. It is the same as regards the crosslinking agent added.

The silicone polymer or the mixture of silicone polymers comprises an organic solvent. According to another alternative form, this aqueous silicone dispersion (silicone latex) can have a filler, for example a siliceous filler, added thereto. It is also envisaged to incorporate a stabilizing agent of the diethylamine or 2-amino-2-methyl-1-propanol type in the silicone latex.

It should be emphasized that, in accordance with the teaching of EP-A-0 739 929, page 5, line 44, transparent crosslinked elastomers can only be obtained from a silicone latex or aqueous silicone dispersion which is devoid of fillers.

The polyorganosiloxane employed is conventionally an α-ω-di-OH polydimethylsiloxane. The surfactant can be an alkylphenol sodium ether sulphate, an ethoxylated trisiloxane, a secondary alcohol ethoxylate, or a trimethylated ammonium chloride carrying a soybean fatty acid alkyl chain.

The catalyst is a condensation catalyst of the dibutyltin dilaurate type and the crosslinking agent is, for example, isobutyltrimethoxysilane. These silicone latices, which are precursors of elastomers and are obtained by emulsification of the silicone oil in a concentrated phase, are devoid of fillers in the examples of EP-A-0 739 929. It is under this sine qua non condition that clarity or transparency values in the vicinity of 100% can be achieved according to a test defined in EP-A-0 739 929.

In this state of the art, one of the essential objectives of the present invention is to provide an aqueous silicone dispersion:

which comprises filler(s), which can be crosslinked into a transparent elastomer by elimination of water and/or of alcohol and/or of a carboxylic residue of the acyloxy type, preferably under ambient atmospheric conditions, and which overcomes the deficiencies and disadvantages of the known dispersions, emulsions or latices of this type.

More particularly, the present invention is targeted at optimizing the transparency properties of the mastics and/or leakproofing/water-repelling coatings obtained by crosslinking from these aqueous silicone dispersions without sacrificing to the other specifications of the technical specification sheet, including, in particular, the stability, the elasticity, the resilience, the hardness, the mechanical strength and the adhesion to conventional substrates (glass, wood, metals or ceramics), and without giving up the low cost price.

Another essential objective of the present invention is to provide an aqueous silicone dispersion which can be correctly and sufficiently rapidly crosslinked by condensation into a transparent, filler-comprising elastomer with enduring mechanical properties.

Another essential objective of the invention is to provide an aqueous silicone dispersion of the type of that described above which is easy to use and in particular easily smoothable and washable with water (cleaning of the tools which have been used in their preparation and in their application) because of the exclusive presence of water as solvent or as liquid component of the continuous phase.

Another essential objective of the invention is to provide an aqueous silicone dispersion which is stable on storage (for example in a container, "pot life").

Another essential objective of the invention is to provide an aqueous silicone dispersion of the type of that described above which results in a transparent and filler-comprising crosslinked elastomer exhibiting an improved flame resistance.

Another objective of the invention is to provide an aqueous silicone dispersion of the type of that described above which is easy to handle and to model, in particular for the purpose of applications such as mastics and/or leakproofing/water-repelling/pointing coatings.

Another essential objective of the invention is to provide a mastic, a leakproofing/water-repelling material or a leakproofing/water-repelling coating which is translucent and which comprises abovesaid dispersion and/or the crosslinked elastomer which results therefrom.

These objectives and others are achieved by the present invention, which results from the demonstration, after lengthy studies and experiments and in an entirely surprising and unexpected way, that the adjustment of the difference in absolute value of the refractive indices of the silicone phase and of the non-silicone hydrophilic phase of a filler-comprising aqueous silicone dispersion within a range of less than or equal to 0.05 makes it possible to render sufficiently transparent the crosslinked elastomer obtained by crosslinking the aqueous silicone dispersion under consideration, even though the latter comprises a particulate filler liable to counteract the translucency.

It follows that the present invention relates to an aqueous silicone dispersion which can be crosslinked into a transparent elastomer of the type of those comprising:

(i) a silicone phase $\phi_S$ with a refractive index $n_S$ comprising:
  at least one crosslinkable polyorganosiloxane (POS) A,
  optionally at least one silicon-comprising adhesion promoter B,
  optionally at least one crosslinking agent D, with the condition according to which at least one of the constituents A, B or D of $\phi_S$ carries at least three crosslinking functional groups per molecule,
  and optionally at least one solvent $S_a$ of the POS A silicone(s), (ii) a non-silicone hydrophilic phase $\phi_H$ with a refractive index $n_H$ comprising at least one filler FI, a surfactant SA and optionally at least one catalyst and/or at least one water-soluble adhesion promoter B', (iii) and water,
characterized in that:

$|n_S-n_H| \leq 0.05$, preferably, $|n_S-n_H| \leq 0.04$.

Within the meaning of the invention, the hydrophilic phase $\phi_H$ comprises all the hydrophilic constituents, with the exception of the water (iii), of the dispersion.

This dispersion exhibits the advantage of being convertible by crosslinking (hydrolysis/condensation), with elimination of water and optionally of alcohol or of acyloxy units, to a cured and transparent elastomer while possessing a particulate filler, for example a siliceous filler, which makes possible a degree of adjustment of the mechanical properties of the elastomer. This possibility is particularly advantageous in applications such as mastics or leakproofing/water-repelling coatings.

Such a result could be obtained by adjustment of the refractive indices $n_S$ and $n_H$ of the silicone phase $\phi_S$ and of the hydrophilic phase $\phi_H$ respectively.

Within the meaning of the invention, the term "transparent" means that the cured silicone elastomer exhibits a transparency $R \leq 30\%$, preferably $R \leq 25\%$ and more preferably still $0\% \leq R \leq 16\%$. R is as defined above with respect to the transmission T given in the Lambert-Beer law for a film with a thickness e=2 mm and for exposure to radiation with a wavelength 400 nm$\leq \lambda \leq$700 nm (visible).

As emerges from the condition given above in the definition of the invention, it is important for the crosslinking function to be provided by at least one of the constituents A, B, B' or D of $\phi_S$. This crosslinking function assumes that at least three crosslinking functional groups (for example OH, alkoxy, acetoxy, ketiminoxy or enoxy) are present per molecule. There is no reason why the crosslinking functional groups should not be different from one another but, in practice, they are preferably only condensable silanol functional groups.

The result of this is that, according to a preferred form of the invention, the abovetargeted aqueous silicone dispersion can be converted into a transparent elastomer, this conversion being accompanied by elimination of water, advantageously by evaporation.

This water is essentially that of the aqueous phase of the emulsion and to a minor extent originates from the condensation of the hydroxyls of the silanols.

Thus, according to a preferred form of the dispersion according to the invention:

the POS A is a polyorganosiloxane oil exhibiting, per molecule, at least two condensable or hydrolysable $\equiv$SiOR$^a$ groups with R$^a$=H or alkyl, R$^a$=H being especially preferred;

the POS A can be crosslinked by condensation or hydrolysis/condensation, optionally in the presence of a condensation catalyst C;

and the optional crosslinking agent D comprises at least one hydroxylated and/or alkoxylated silicone resin and optionally at least one alkoxysilane E which supplies the $\equiv$SiOR$^a$ ends of the POS A.

The main constituent of the dispersion, on a weight basis, is the polyorganosiloxane POS A. The POS A preferably comprises at least one viscous and reactive silicone homopolymer or copolymer capable of forming, by polycondensation, a crosslinked three-dimensional network:

either alone, if it is tri- or polyfunctional, or in combination with a crosslinking agent B and/or B', D and/or E, if the POS A is only difunctional.

The functionalities under consideration are crosslinking functionalities, preferably crosslinking by (hydrolysis)/condensation. These functionalities are, for example, hydroxyl or alkoxyls.

The general formula of the POS A is preferably as follows:

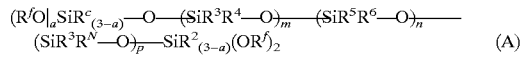

(A)

in which:

$R^f$=corresponds to hydrogen or a linear or branched $C_1$–$C_4$ alkyl optionally substituted by a linear or branched $C_1$–$C_3$ alkyl (for example:
methyl, ethyl, propyl, ethoxyethyl);

$R^3$, $R^4$, $R^5$ and $R^6$ are identical or different radicals chosen from:
linear or branched $C_1$–$C_{30}$ alkyls (for example: methyl ... dodecyl), and/or linear or branched $C_2$–$C_{20}$ alkenyls (for example: vinyl or allyl), and/or $C_6$–$C_{12}$ aryls optionally substituted by 1 to 3 linear or branched $C_1$–$C_3$ alkyls (for example: phenyl or totyl), and/or aralkyls comprising, for the aryl part, $C_6$–$C_8$ carbon atoms and, for the linear or branched alkyl part, $C_1$–$C_4$ carbon atoms (for example:
benzyl,
phenetyl or

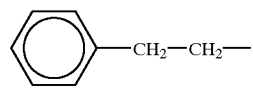

the radical

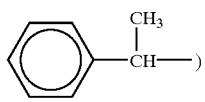

and/or aralkenyls comprising, for the aryl part, $C_6$–$C_8$ carbon atoms and, for the linear or branched alkenyl part, $C_1$–$C_4$ carbon atoms (for example styryl);

$R^N$ corresponds to radicals, which are identical or different from one another, which are defined as being amine-comprising radicals, preferably aminoalkyl radicals, or alkyl radicals comprising one or more epoxide and/or carboxylic and/or methacryloxy and/or mercapto and/or isocyanate and/or isocyanurate and/or cyano functional groups;

$R^e$ represents radicals, which are identical or different from one another, which are defined as being radicals corresponding to the same definition as that given above for $R^3$, $R^4$, $R^5$ and $R^6$ and/or radicals corresponding to the same definition as that given above for $R^N$;

a=1, 2 or 3;

m, n and p$\geq$0 and m, n and p are chosen such that $|n_S - n_H| \leq 0.05$ with m+n+p>200 and preferably m+n+p>700.

The POS A is advantageously a silicone oil formed by a homo- or a copolymer of formula A given above, in which $R^f$ corresponds to hydrogen, a=1, $R^e$ and $R^3$ to $R^6$ are radicals, which are identical or different from one another, chosen from:
  linear or branched $C_1$–$C_{15}$ alkyls (preferably methyl . . . dodecyl),
  and/or phenyls and/or tolyls,
  and/or benzyl and/or phenetyl radicals and/or radicals of formula:

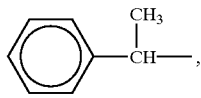

and/or styryls.

In the context of the present invention, use may especially be made of oils A prepared by the anionic polymerization process disclosed in the abovementioned U.S. Pat. No. 2,891,920 and in particular U.S. Pat. No. 3,294,725 (cited as reference). The polymer obtained is anionically stabilized by a surface-active agent which, in accordance with the teaching of U.S. Pat. No. 3,294,725, is preferably the salt of an alkali metal of a hydrocarbonaceous aromatic sulphonic acid, the free acid also acting as polymerization catalyst. The preferred catalyst and the preferred surface-active agents are dodecylbenzenesulphonic acid or alkyl sulphuric acid and their alkali metal salts, in particular their sodium salts. Other anionic or nonionic surface-active agents can optionally be added. However, this addition is not necessary as, in accordance with the teaching of U.S. Pat. No. 3,294,725, the amount of anionic surface-active agent resulting from the neutralization of the sulphonic acid is sufficient to stabilize the polymer emulsion. This amount is generally less than 3%, preferably 1.5%, of the weight of the emulsion.

This emulsion polymerization process is particularly advantageous as it makes it possible to directly obtain an emulsion comprising the oil A. Furthermore, this process makes it possible to obtain, without difficulty, oils A in an emulsion of very high viscosity.

In accordance with the invention, it will be preferable, however, to start from oils A which are already polymerized for the preparation of the dispersion by using, for example, the techniques for emulsifying the silicone phase disclosed in FR-A-2 697 021.

Furthermore, it is preferable for the viscosity η at 25° C. of these POS A to be at least 100 mPa.s, preferably at least 50 000 mPa.s. This is because it is in particular for viscosities η of greater than 50 000 mpa.s that an elastomer is obtained which exhibits an array of suitable mechanical properties, in particular with regard to the Shore A hardness and the elongation. In addition, the higher the viscosity, the more the mechanical properties are retained during the ageing of the crosslinked elastomer which can be obtained from the aqueous dispersion. The viscosities η at 25° C. chosen in practice within the context of the invention are between $5 \times 10^4$ and $15 \times 10^5$ mPa.s.

All the viscosities dealt with in the present account correspond to a dynamic viscosity quantity at 25° C. referred to as "Newtonian", that is to say the dynamic viscosity which is measured, in a way known per se, at a shear rate gradient which is sufficiently low for the viscosity measured to be independent of the rate gradient.

The optional adhesion promoters B and B' of the phases $\phi_S$ and $\phi_H$ respectively can correspond to any known product, including in particular:

(i) An amine-comprising and silicon-comprising compound, which is optionally salified, formed of several repeat units of following mean formula (I):

in which:
  $R^{10}$ represents a nitrogen-free monovalent group, identical or different in nature from one repeat unit to another, corresponding to hydrogen, a $C_1$–$C_6$ alkyl, an aryl or a $C_2$–$C_8$ alkenyl which is optionally substituted, preferably by a halogen or halogenated radical, $R^{10}$ being selected more particularly from the group consisting of H and optionally halogenated $C_1$–$C_4$ alkyl, the methyl, ethyl, propyl, 3,3,3-trifluoropropyl, vinyl, allyl and phenyl groups being more especially preferred;
  $R^{20}$ represents a hydrocarbonaceous monovalent group bonded to the silicon via an Si—C bond and comprising at least one nitrogen atom, $R^{20}$ being identical or different in nature from one repeat unit to another;
  $R^{30}$ is a hydrocarbonaceous group comprising from 1 to 18 carbon atoms and preferably corresponding to the same definition as that given above for $R^{10}$,
  x, y and z are integers or positive decimal numbers of less than 4,
  and x+y+z<4.

This amine-comprising and silicon-comprising compound (i) is as disclosed in French Patent Application FR-A-2 724 661, for which further reference may be made to the details therein. In the case where this promoter (i) exhibits a certain amine content (e.g. at least one amine function group per silicon) and/or is salified (according to the pH), said promoter (i) is then hydrophilic, indeed even water-soluble, and corresponds to a promoter G' included in $\phi_H$.

(ii)
- (ii.1) a silane substituted by hydroxyls or alkoxyls and hydrophilic functional groups for anchoring to the substrate, such as amines (e.g. aminopropyltrihydroxysilane), and/or their hydrolysis and/or condensation products.
- (ii.2) linear hydroxylated polydiorganosiloxanes with D and/or MD siloxyl units; mention may be made, as example of polydiorganosiloxane, of hydroxylated polymethylsiloxane.
- (ii.3) a hydroxylated POS resin comprising T and optionally M and/or D and/or Q siloxyl units or alternatively Q and M and/or D and/or T siloxyl units.

Mention may be made, as examples of resins, of T(OH), DT(OH), DQ(OH), DT(OH), MQ(OH), MDT(OH), MDQ(OH) and the mixtures of these. In addition to the OH groups, these promoters (ii.3) each comprise one or more functional groups for anchoring to a substrate, which functional groups are identical or different from one another and are chosen from the group consisting of the amino-, epoxy-, acrylo-, methacrylo-, ureido-, mercapto-, chloroalkyl- and preferably aminoalkyl (aminopropyl) functional groups.

For more details with regard to these promoters (ii), reference will be made to French Patent Application FR-A-2 753 708, which fully describes this promoter.

As soon as the product forming the promoter (ii) has a hydrophilic nature, indeed even water-soluble nature, it comes within the category of the hydrophilic promoters B' of $\phi_H$. This is in particular the case when (ii) is salified and/or when it is an amine-comprising organosilicon compound comprising at least one amine function group per silicon.

- (iii) A nitrogenous adhesion promoter of the potassium N-(2-aminoethyl)-3-aminopropylmethylsilanolate type or of the polydimethylsiloxane functionalized by 3-(2-aminoethylamino)propyl units type according to EP-A-0 572 006.
- (iv) A siliconate R—Si(OM)3 or its condensation products with M=K$^{30}$, Na$^{30}$ or NH4$^+$ cation, these siliconates or derivatives (iv) being, because of their salified nature, hydrophilic promoters B' present in $\phi_H$.
- (v) Organotrialkoxysilanes (such as vinyltrimethoxysilane) and alkyl silicates, such as methyl silicate or ethyl silicate or their partial hydrolysis/condensation products, that is to say alkyl polysilicates, such as methyl polysilicate and ethyl polysilicate, at a content of 0.1 to 20 parts of adhesion agent per 100 parts by weight of POS A.

The organotrialkoxysilanes and the alkyl silicates preferably correspond to the general formula:

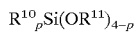

in which:
  R$^{11}$ is an alkyl radical having from 1 to 4 carbon atoms,
  R$^{10}$ corresponds to the same definition as R11 or to a vinyl.
- (vi) Organodi(or tri)alkoxysilanes comprising epoxy, carboxylic, methacryloxy, mercapto, isocyanate, isocyanurate or cyano groups and the hydrolysis and condensation products of these organoalkoxysilanes.
- (vii) Titanates or zirconates (chelated or non-chelated).

It should be added, as regards the promoters B and B' defined above of (i) to (vii), that a person skilled in the art is entirely able to identify and to choose from the products thus defined, on the one hand, those which are hydrophilic and which are capable of forming the promoters B' of $\phi_H$ and, on the other hand, those which do not have this hydrophilic nature and which can be employed as promoter B in $\phi_S$.

As regards the optional crosslinking agent D, which alone or in addition to the POS A and/or to the promoter B and/or B' takes on the role of crosslinking agent, one of its essential characteristics is to be soluble in $\phi_S$ or dispersible in the silicone phase $\phi_S$ in the form of nanometric particles.

It can be itself also formed of at least one hydroxylated and/or alkoxylated silicone resin having a content by weight of hydroxyl and/or alkoxyl groups of between 0.1 and 10%, preferably between 0.4 and 4%.

This resin D exhibits, per molecule, at least two different units chosen from those of formula M, D, T and Q, at least one being a T or Q unit.

Mention may be made, as examples of organic substituents of these units, of the methyl, ethyl, isopropyl, tert-butyl, n-hexyl and phenyl radicals.

These silicone resins are well-known branched organopolysiloxane polymers, the processes for the preparation of which are disclosed in a great many patents.

Mention may be made, as examples of resins which can be used, of MQ resins, MDQ resins, TD resins and MDT resins.

Use may be made of resins which are solid or liquid at room temperature. These resins can be incorporated as such in the emulsions in the POS A, in solution in an organic solvent or a silicone oil, or else in the form of aqueous emulsions (EP-A-0 359 676).

Aqueous emulsions of silicone resins which can be used are, for example, disclosed in U.S. Pat. Nos. 4,028,339, 4,052,331, 4,056,492, 4,525,502 and 4,717,599 cited as reference.

As indicated above, this optional resin D can act as crosslinking agent by virtue of its hydroxyl and/or alkoxyl functional groups, which are capable of reacting by condensation with the OR$^a$ groups of the silicone oil A.

According to another alternative form, the optional crosslinking agent D can be formed by the above described (optionally salified) aminoalkylated silicone resin (i), the latter comprising, for this purpose, molecules having at least three OR$^3$ groups per molecule, which corresponds to w+y$\leq$2 in (I).

It should be noted that, in the alternative forms of the type of those described above where the cross-linking agent D can be formed by the hydrophilic promoter B' present in $\phi_H$, this crosslinking agent D/B' consequently has the property of being soluble in $\phi_H$ or dispersible in $\phi_H$ in the form of nanometric particles.

The alkoxysilane E can play the same crosslinking role as D. However, it can only react with the silicone oil A provided that a prior hydrolysis of the OR$^a$ functional groups is carried out.

Mention may be made, as examples of alkoxysilane E, of ViSi(OEt)$_3$, ViSi(OMe)$_3$, Si(OEt)$_4$, MeSi(OMe)$_3$ or Si(OMe)$_4$, Me=CH$_3$ and Et=CH$_3$CH$_2$. According to alternative forms, the crosslinking agent E can also be chosen from the following products: siliconate, silicate, silica (powdered or colloidal and their mixtures). If appropriate, these products can be used in combination with the above-mentioned silicone resins.

As regards the catalyst C, it is preferably a catalytic tin compound. The latter is generally an organotin salt preferably introduced in the form of an aqueous emulsion. The organotin salts which can be used are described in particular in the work by Noll, Chemistry and Technology of Silicones, Academic Press (1968), page 337.

Use may also be made, as catalytic tin compound, of the reaction product of a tin salt, in particular of a tin dicarboxylate, with ethyl polysilicate, as disclosed in Patent U.S. Pat. No. 3,862,919.

The reaction product of an alkyl silicate or of an alkyl-trialkoxysilane with dibutyltin diacetate, as disclosed in Belgian Patent BE-A-842 305, may also be suitable.

According to another possibility, recourse is had to a tin(II) salt, such as $SnCl_2$ or stannous octoate. The preferred tin salts are tin bischelates (EP-A-147 323 and EP-A-235 049) or diorganotin dicarboxylates, in particular dibutyl- or dioctyltin diversatates (British Patent GB-A-1 289 900), dibutyl- or dioctyltin diacetate, or dibutyl- or dioctyltin dilaurate. Use is made of 0.01 to 3, preferably of 0.05 to 2, parts of organotin salt per 100 parts of A. According to alternative forms, use may also be made, as catalyst F, of strong acids or bases (KOH, NaOH) or amines (optionally the amine of the resin C).

Several embodiments of the dispersion can be envisaged in satisfying the essential characteristics of the dispersion according to the invention, namely $|n_S - n_H| \leq 0.05$.

According to a first embodiment, the dispersion comprises at least one POS A1 with a refractive index $n_{A1}$ such that $|n_{A1-nH}| > 0.04$, this POS A1 furthermore being used in combination with at least one agent for enhancing the $n_S$ preferably chosen from the solvents $S_a$ of the POS A1, this enhancing agent furthermore being present in proportions chosen such that it is miscible with $\phi_S$.

The POS A1 is preferably a silicone oil formed by an α,ω-diOh diorganopolysiloxane of following formula:

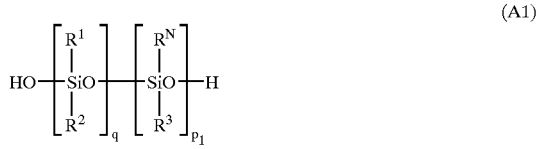

(A1)

in which:
R¹, R² are radicals which are identical or different from one another and correspond:
  to a linear or branched $C_1-C_6$ alkyl, preferably to a methyl, an ethyl, a propyl, a butyl, a pentyl or a hexyl,
  or to a linear, branched or cyclic $C_1-C_6$ alkenyl, preferably a vinyl;
$R^N$ and R³ are as defined above in the formula (A);
$q \geq 10$;
$p_1 \geq 0$.

These organic radicals R¹, R², R³ and R⁴ can additionally be optionally substituted by cyano or fluoro groups. As regards the radicals R¹, R² and R³, the substituents generally used, because of their availability in industrial products, are the methyl, ethyl, propyl, vinyl and 3,3,3-trifluoropropyl radicals. Generally, at least 80% by number of these radicals are methyl radicals.

In practice, α-ω-dihydroxypolydimethyl-siloxanes with

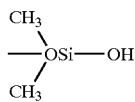

ends will be favoured as POS A1.

The agent for enhancing the $n_S$ has a refractive index $n_R$ which can be defined as follows:

$n_R > n_{A1}$, and preferably $n_R > n_H$.

In practice, $n_R$ is, e.g., such that $n_R > 1.460$, preferably $n_R \geq 1.475$.

This agent for enhancing the $n_S$ is advantageously selected from the group of compounds consisting of:
a) at least one liquid paraffin (monomer and/or oligomer and/or polymer);
b) at least one alkyl phthalate comprising a linear or branched alkyl residue having from 1 to 13 carbon atoms (monomer);
c) at least one alkylaromatic with a molecular weight $\geq 200$ g/mol (monomer and/or oligomer and/or polymer),
d) and their mixtures.

The enhancing agent is preferably chosen from the alkylaromatic compounds c) and more preferably still from the following compounds C:
α) a monoalkylbenzene comprising a linear or branched alkyl residue having from 9 to 30 carbon atoms,
β) a dialkylbenzene comprising linear or branched alkyl residues having from 5 to 25 carbon atoms,
γ) a diphenylalkane comprising a linear or branched alkane residue having from 4 to 25 carbon atoms,
δ) an alkylate comprising at least one monoalkylbenzene α and/or at least one dialkylbenzene β and/or at least one diphenylalkane γ.

For more details regarding these alkylaromatic compounds c), reference will be made to Patent FR-A-2 446 849.

Mention may be made, as examples of commercial compounds c), of those sold by Chevron under the trade name "alkylat Progiline 155".

The mean composition of this alkylat Progiline is a mixture based on:
35–50% by weight of monoalkylbenzenes comprising branched alkyl residues having from 12 to 25 carbon atoms,
and 65–50% by weight of meta- and para-dialkylbenzenes comprising branched alkyl residues having from 16 to 20 carbon atoms.

It is obvious that this enhancing agent for the $n_S$ is used in proportions chosen such that it is miscible with $\phi_S$.

In the context of a second embodiment of the dispersion according to the invention, provision is made for the use of a POS A2 having a refractive index $n_{A2}$ relatively close to that $n_H$ of the silicone phase $\phi_H$. Thus, according to this second embodiment, the dispersion comprises at least one POS A2 with a refractive index $n_{A2}$ chosen such that $|n_{A2} - n_H| \leq 0.04$, the POS A2 thus preferably belonging to the family of the diorganosiloxane copolymers of following formula (A2):

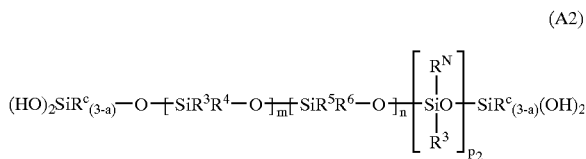

(A2)

in which:
R³ and R⁴ are radicals, which are identical or different from one another, each comprising a linear or branched $C_1-C_6$ alkyl, preferably a methyl, an ethyl, a propyl, a butyl, a pentyl or a hexyl;

$R^5$ are radicals, which are identical or different from one another, each comprising:
a linear or branched $C_1$–$C_6$ alkyl, preferably a methyl, an ethyl, a propyl, a butyl, a pentyl or a hexyl;
and/or a phenyl and/or a tolyl;
and/or a benzyl and/or a phenetyl and/or a radical of formula:

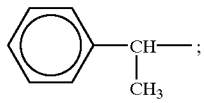

and/or a styryl;

$R^6$ are radicals, which are identical or different from one another, each comprising:
a linear or branched $C_7$–$C_{15}$ alkyl, preferably an octyl, a nonyl and/or a dodecyl;
and/or a phenyl and/or a tolyl;
and/or a benzyl and/or a phenetyl and/or a radical of formula:

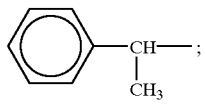

and/or a styryl;

$R^e$ corresponding to any one of the definitions given above for $R^3$, $R^4$, $R^5$ and $R^6$;

$R^N$ and $R^3$ being as defined above in the key to the formula (A);

a=1;

m, n and p≧0; m and n are such that $|n_S-n_H|<0.05$, with m+n>200, preferably m+n>700.

It is important to emphasize that these copolymers A2 can be block or random copolymers. Mention may be made, as examples of POS A2, of:
poly(diphenyl)(dimethyl)siloxane,
poly(methylphenyl)(dimethyl)siloxane,
poly(methyloctyl)(dimethyl)siloxane,
poly(methyldodecyl)(dimethyl)siloxane,
poly(methylaryl)(dimethyl)siloxane, in which the aryl substituents are, for example, phenetyls and/or styryls and/or aryls of formula:

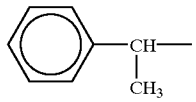

According to an alternative form of the second embodiment, the POS A2 defined by $|n_{A2}-n_H|≦0.04$ is used in combination with at least one agent for enhancing the ns preferably chosen from the solvents $S_a$ of the POS A2, this enhancing agent furthermore being present in proportions chosen such that it is miscible with $\phi_S$.

This agent for enhancing the ns has a refractive index $n_R$ and has been defined above in the context of the description of the first embodiment of the invention.

In accordance with a third embodiment of the dispersion according to the invention, this third embodiment being a result of the first two embodiments, said dispersion comprises at least one POS A1 with a refractive index such that $|n_{A1}-n_H|>0.04$ and at least one POS A2 with a refractive index such that $|n_{A2}-n_H|≦0.04$, A1 and A2 furthermore being at least partially miscible with one another.

According to an alternative form of this third embodiment, the dispersion additionally comprises at least one agent for enhancing the refractive index $n_S$ of the silicone phase preferably chosen from the solvents S common to POS A1 and to POS A2, this enhancing agent furthermore being present in proportions chosen such that it is miscible with $\phi_S$. In this alternative form, the enhancing agent is a solvent S of A1 and A2 (third-party solvent). It follows from this that the miscibility of A1 and A2 when they are alone is no longer a necessary condition. This third-party solvent S can be selected from the solvents Sa as defined above.

In accordance with the invention, an alternative to the step presented above of adjusting $|n_S-n_H|$ by varying the rise in the refractive index $n_S$ of the silicone phase $\phi_S$ would be to lower the refractive index $n_H$ of the non-silicone hydrophilic phase $\phi_H$.

It follows from this that a fourth embodiment of the dispersion is provided in accordance with the invention, according to which embodiment the dispersion is characterized in that $\phi_H$ comprises at least one surfactant SA selected from ionic, nonionic or amphoteric fluorinated surfactants and their mixtures, preferably from the group of compounds consisting of:
perfluoroalkyls,
perfluorobetaines,
ethoxylated polyfluoroalcohols,
polyfluoroalkylammoniums,
surface-active agents, the hydrophilic part of which comprises one or more saccharide unit(s) carrying from five to six carbon atoms and the hydrophobic part of which comprises a unit of formula $Rf(CH_2)_n$—, in which n=2) 20 and Rf represents a perfluoroalkyl unit of formula $C_mF_{2m+1}$, in which m=1 to 10;
polyelectrolytes exhibiting fatty perfluoroalkyl side groups;

SA furthermore having a refractive index $n_{SA}≦1.5$, preferably ≦1.43.

The term "fluorinated surface-active agent" is understood to mean, as is fully known per se, a compound formed of an aliphatic perfluorocarbonaceous part comprising at least three carbon atoms and an ionic, nonionic or amphoteric hydrophilic part. The perfluorocarbonaceous part of at least three carbon atoms can represent either the whole or only a fraction of the fluorocarbonaceous part of the molecule. A large number of references regarding this type of compound are found in the literature. A person skilled in the art may refer in particular to FR-A-2 149 519, WO-A-94 21 233, U.S. Pat. No. 3,194,767 or the work "Fluorinated Surfactants", Erik Kissa, published by Marcel Dekker Inc., chapter 4, in particular Tables 4.1 and 4.4. Mention may in particular be made of the products sold by Du Pont Chemicals under the name Zonyl®, for example FSO, FSN, FS-300 or FSD, the fluorinated surfactants with the name Forafac® distributed by Elf Atochem and the products sold under the name Fluorad® by 3M. Mention will in particular be made, among the surfactants, of anionic, cationic, nonionic and amphoteric perfluoroalkylated compounds and, among these, more particularly of surfactants of the class of the Zonyl® products sold by Du Pont, e.g.:

$F(CF_2CF_2)_{3-8}CH_2CH_2SCH_2CH_2COOLi$ (anionic),
$F(CF_2CF_2)_{3-8}CH_2CH_2O(CH_2CH_2O)_yH$ (nonionic)
$F(CF_2CF_2)_{3-8}CH_2CH_2SCH_2CH_2N^+(CH_3)_3CH_3SO_4^-$ (amphoteric)

F(CF$_2$CF$_2$)$_{3-8}$CH$_2$CH(OCOCH$_3$)CH$_2$N$^+$(CH$_3$)$_2$CH$_2$CH$_2$CO$_2^-$ (amphoteric),
sold by Du Pont under the names Zonyl® FSA, Zonyl® FSO, Zonyl® FSC and Zonyl® FSK respectively.

There may more specifically be named, in connection with these products:

Zonyl® FSO 100: CAS 65545-80-4, (nonionic), 99 to 100%, the remainder being 1,4-dioxane Zonyl® FSN: CAS 65545-80-4, 99 to 100%, the remainder being sodium acetate and 1,4-dioxane Zonyl® FS-300: CAS 65545-80-4, 40%, the remainder being 1,4-dioxane (<0.1%) and water Zonyl® FSD: CAS 70983-60-7, 30%, (cationic), the remainder being hexylene glycol (10%), sodium chloride (3%) and water (57%).

Mention may also be made of:

perfluoroalkylbetaines (amphoteric) such as that sold by Elf Atochem under the name Forafac 1157, ethoxylated polyfluoroalcohols (nonionic), such as that sold by Elf Atochem under the name Forafac 1110 D, and polyfluoroalkylammonium salts (cationic), such as that sold by Elf Atochem under the name Forafac 1179;

surface-active agents, the hydrophilic part of which comprises one or more saccharide unit(s) comprising from 5 to 6 carbon atoms (units derived from sugars such as fructose, glucose, mannose, galactose, talose, gulose, allose, altose, idose, arabinose, xylose, lyxose and/or ribose) and the hydrophobic part of which comprises a unit of formula R$_F$(CH$_2$)$_n$ where n can range from 2 to 20, preferably from 2 to 10, and R$_F$ represents a perfluoroalkyl unit of formula C$_m$F$_{2m+1}$ with m being able to range from 1 to 10, preferably from 4 to 8, chosen from those exhibiting the characteristics defined above. Mention may be made of the monoesters of perfluoroalkylated fatty acids and of sugars such as α,α-trehalose and sucrose, it being possible for the monoester functional group to be represented by the formula R$_F$(CH$_2$)$_n$C(O) where n can range from 2 to 10 and R$_F$ represents a perfluoroalkyl unit of formula C$_m$F$_{2m+1}$ with m being able to range from 4 to 8, which are described in JAOCS, Vol. 69, No. 1 (January 1992) and are chosen from those exhibiting the characteristics defined above;

polyelectrolytes exhibiting fatty perfluoroalkyl side groups, such as polyacrylates exhibiting R$_F$(CH$_2$)$_n$ groups where n can range from 2 to 20, preferably from 2 to 10, and R$_F$ represents a perfluoroalkyl unit of formula C$_m$F$_{2m+1}$ with m being able to range from 1 to 10, preferably from 4 to 8, chosen from those exhibiting the characteristics defined above; mention may be made of the polyacrylates exhibiting —CH$_2$C$_7$F$_{15}$ groups described in J. Chim. Phys., (1996) 93, 887–898, and chosen from those exhibiting the characteristics defined above.

According to a preferred characteristic of this fourth embodiment, the dispersion is characterized by a concentration of SA, expressed as % by weight with respect to $\phi_H$, is the following:

$$0.5 \leq [SA] \leq 10,$$

preferably, $1 \leq [SA] \leq 6$.

Naturally, SA can be composed of one or more fluorinated surfactants in combination with other surfactants, without this being harmful to the transparency of the final elastomer.

In the same way that surfactants are selected having a reduced refractive index n$_{SA}$ similar to that of the silicone phase, in order to lower the index n$_H$ of $\phi_H$, it can be envisaged, according to other embodiments, to select the constituents of $\phi_H$ from those having a low refractive index and thus liable to lower the overall index n$_H$.

Furthermore, the present invention also encompasses the case according to which there would exist a dispersion where at least one of the constituents of the silicone phase $\phi_S$ would be chosen for its refractive index sufficiently close to n$_H$ and at least one of the constituents of the non-silicone hydrophilic phase $\phi_H$ would be chosen for its index sufficiently low to be close to, indeed even less than or equal to, n$_S$.

The aqueous silicone dispersion according to the preferred embodiments defined above makes it possible to obtain a final elastomer which satisfies the specification sheet and which in particular has transparency characteristics such that the coefficient of extinction ε, expressed in mm$^{-1}$, is ≦1, preferably ≦0.8, respectively for |n$_H$−n$_S$|≦0.05 and for |n$_H$−n$_S$|≦0.04.

This transparency is obtained notwithstanding the presence of a filler, preferably a silicic filler, essential for improving the mechanical properties of the final elastomer.

According to even more preferred embodiments, the dispersion is characterized by the following composition, in parts by weight on a dry basis:

100 of at least one POS A1 of the α,ω dihydroxylated polydimethylsiloxane silicone oil kind, or of at least one POS A2 of the α,ω dihydroxylated copolymer silicone oil kind:
    with dimethylsiloxane units and with diphenylsiloxane units,
    with methyl(alkylstyryl)siloxane units and with dimethylsiloxane units,
    with methyl(octyl or dodecyl)siloxane units and with dimethylsiloxane units, or
    with methylphenylsiloxane units and with dimethylsiloxane units;

0 to 10 of at least one adhesion promoter B and/or B' chosen from amine-comprising silicone resins or oligomers comprising D, T and/or Q, optionally M, siloxyl units, at least part of the D, T or M units carrying one or more amine functionalities D(N) and/or T(N) and/or and/or from hydroxylated linear POSs and/or hydroxylated silicone resins, preferably from resins of the T(OH), DT(OH), DQ(OH), DT(OH), MQ(OH), MDT(OH) or MDQ(OH) kind and their mixtures;

0 to 10 of at least one crosslinking agent D chosen:
    from hydroxylated silicone resins, preferably from resins of the T(OH), DT(OH), DQ(OH), DT(OH), MQ(OH), MDT(OH) or MDQ(OH) kind and their mixtures, these resins having silicons substituted by vinyl and/or phenyl and/or 3,3,3-trifluoropropyl and/or linear or branched C$_1$–C$_6$ (advantageously C$_1$) alkyl radicals,
    and/or silicas;

0 to 5 of at least one alkoxysilane E of formula R$^b_{3-t}$Si(OR$^a$)$_t$ with R$^a$ as defined above, R$^b$=optionally substituted C$_1$–C$_6$ (cyclo)alkyl or alkenyl and t=1, 2 or 3;

0 to 30 at least one solvent S$^a$ of the POS A, preferably comprising an alkyl-benzene(co)polymer;

0 to 2 of at least one condensation catalyst C;

0.5 to 10 of at least one surfactant SA;

2 to 20 of at least one siliceous filler FI preferably selected from the following products: precipitated or non-precipitated silica, colloidal or powdered silica and mixtures of these products;

0 to 20 of at least one silicon-comprising additive SC, such as sodium silicate or such as organosilicate;

with the condition according to which at least one of the components D, B, B' or E is present in the composition.

The fillers FI employed can for example be reinforcing siliceous fillers FI.

Such siliceous fillers have a particle size generally of between a few nanometres of 300 $\mu$m and a BET [lacuna] surface of greater than 50 m²/g.

These siliceous fillers are chosen, e.g., from colloidal silicas, combustion and precipitation silica powders or their mixtures.

These silicas are well known; they are used in particular as fillers in silicone elastomer compositions which can be vulcanized under hot conditions to a silicone rubber. These silicas exhibit a mean particle size generally of less than 0.1 $\mu$m and a BET specific surface preferably of between 100 and 350 m²/g.

Use may also optionally be made (at a low dose) of semi-reinforcing siliceous fillers, such as diatomaceous earths, crushed quartz or optionally an alumina hydrate or a titanium dioxide, with the proviso that such fillers are sufficiently fine not to be harmful to the transparency (nanometric fillers).

Use will preferably be made of colloidal silicas which are provided in the form of fine silica particles (less than or equal to 100 nm) predispersed in water or organic polymer (non-silicone) nanolatices, such as claimed in Application PCT WO-A-97/47 687. These fillers FI are introduced into the emulsion in the form of a dry powder or in the form of colloidal dispersions, for example by simple mixing.

In addition to the fluorinated surfactants defined above, it is also possible to employ non fluorinated surfactants SA which are selected, for example, from the salts of the alkali metals of hydrocarbonaceous aromatic sulphonic acids or alkyl sulphuric acids and the preferred nonionic surface-active agents are polyoxyethylenated alkylphenols or polyoxyethylenated fatty alcohols.

The amount of surfactant which can be used is that commonly employed for the emulsification as disclosed in particular in the abovementioned patents and in U.S. Pat. No. 2,891,920.

The nonionic (preferably), ionic or amphoteric surfactants can be employed alone or as a mixture with one another.

Various additives can be added to the dispersions according to the invention. These additives make it possible to modify their properties and those of the final elastomers.

Thus, the dispersion moreover optionally comprises at least one dispersing agent F and/or at least one plasticizer G and/or at least one fungicidal agent H and/or at least one antifoaming agent I and/or at least one stabilizing or thickening agent J and/or at least one base K and/or one pigment or dye L (inorganic or organic).

The dispersing agents F can be composed, for example, of sodium polyacrylates and or of sodium hexameta-phosphate.

The plasticizers G are preferably chosen from unreactive (blocked) silicone oils and/or from products which enhance the index $n_S$ of $\phi_S$ (solvents $S_a$ and S), such as those described above and in particular alkylbenzenes and especially those disclosed in Patent Application FR 2 446 849.

The stabilizing or thickening agents J can be carboxymethylcellulose or xanthan gum.

Mention may be made, as examples of pigments or dyes L, of:

carbon black, aluminium oxide, expanded or non expanded vermiculite, calcium carbonate, zinc oxide, mica, talc, iron oxide, barium sulphate, slaked lime and their mixtures.

According to a preferred form of the invention, the aqueous silicone dispersion which can be crosslinked into an adhesive elastomer is a filler-comprising oil-in-water emulsion, the solids content of which is greater than or equal to 40% by weight, preferably to 80% by weight, and more preferably still between 80% and 95% by weight.

According to an advantageous alternative form, the dispersion of the invention as defined above is additionally characterized in that it comprises droplets of dispersed silicone phase $\phi_S$ provided in an at least partially crosslinked form.

The dispersion can be stocked in this form, before use, in an appropriate packaging with air excluded (such as, e.g., a container for application of mastic). And it is only after application to a substrate that the droplets of $\phi_S$ combine by coalescence to form a homogeneous material which subsequently completes its conversion to elastomer by crosslinking and elimination of water (evaporation).

The dispersions according to the invention are more particularly suitable in the building industry, in the production of mastics, of draughtproofing and leakproofing materials, such as seals, or alternatively for preparing films, coatings or other thin layers.

According to another of its aspects, the present invention relates to a process for the preparation of the dispersion as defined above. This process is characterized in that it consists essentially in producing an emulsion of at least a portion of the silicone phase $\phi_S$ in an aqueous phase comprising at least a portion of the hydrophilic phase $\phi_H$ and/or water using mechanical stirring means.

Thus, in accordance with the invention, the silicone phase $\phi_S$ which is emulsified in the aqueous phase comprises all or part of its constituents [(A), (B), (Sa), (S), (D) or (E), inter alia] before the stage of emulsification proper (mixing/homogenization-stirring) with the aqueous phase takes place.

According to an embodiment of the process of the invention, a silicone phase $\phi_S$ comprising only at least a portion of the POS A is emulsified with the aqueous phase comprising all or part of the non-silicone hydrophilic phase $\phi_H$ [(SA), (B'), (C) or (FI), inter alia] and a small amount of water. This emulsification in a concentrated phase (5 to 10% by weight of water with respect to the total mass of POS A oil employed) is followed by the incorporation or by the successive incorporations, or not, of the other components of the phases $\phi_S$ and $\phi_H$ and water.

According to another embodiment, on the one hand, the silicone phase $\phi_S$ is prepared by mixing all these constituents and, on the other hand, the hydrophilic phase $\phi_H$ is prepared by mixing all these constituents, and then $\phi_S$ is subsequently emulsified in $\phi_H$ while also incorporating the water.

All the other alternative forms for the preparation of the dispersion can be envisaged. It is thus possible first of all to mix the POS A and a portion of the crosslinking agent D and subsequently to emulsify with the aqueous phase comprising all or part of $\phi_H$ and all or part of the water. The incorporation of the remainder of the constituents of $\phi_S$ and optionally of $\phi_H$ and of the water in the emulsion subsequently taking place according to one or more additions.

In any case, it is preferable for the filler FI of $\phi_H$ to be added to the mixture after the emulsification.

The emulsification is advantageously carried out using conventional homogenizing and stirring means, such as, for example, kneaders, planetary mixers, colloid mills, extruders of the single- or twin-screw type or homogenizers, at a temperature for example of between 10 and 50° C. The pH is optionally adjusted between 4 and 13 by addition of organic or inorganic acid or base (e.g. potassium hydroxide or amine).

The final dispersion obtained is homogenized and then degassed and it is subsequently packaged in a packaging with air and water vapour excluded.

For the mastic and/or leakproofing/water-repelling material application, the solids content of the dispersion is preferably between 80 and 95% by weight.

As regards the coating, film or paint which can be crosslinked into a thin layer application, this solids content is advantageously between 40 and 75% by weight.

The preparations described above corresponding to the production of a precursor system of the crosslinked form of the dispersion of the invention, said precursor being provided in a single-component form which can be crosslinked by elimination of water, for example by virtue of the drying which results from being placed under ambient conditions.

The preferred precursor system according to the invention is of the single-component type.

However, it can also be a multi-component system, for example a twin-component system, which can be crosslinked by mixing the components immediately before application.

A twin-component system is formed by two separate parts P1 and P2 intended to be mixed to form the dispersion, one of these parts P1 or P2 comprising the oil A and the other the crosslinking agent, the catalyst F optionally being present in only one of the parts P1 or P2.

Another subject-matter of the invention is all the final products, including in particular mastics, transparent and adhesive leakproofing/water-repelling materials or coatings, or films, paints or coatings of medium thickness comprising the dispersion and/or the crosslinked elastomer obtained by drying this dispersion.

The invention is also targeted at the at least partially crosslinked silicone elastomer as defined above in that it is obtained from the dispersion according to the invention, preferably according to a crosslinking by condensation.

By virtue of their transparency, the dispersions and the crosslinked elastomers according to the invention are liable to have numerous outlets in the field of mastics, of leakproofing materials, of materials for forming coatings as thin layers, of films or of paints, inter alia. This transparency is all the more advantageous as it is obtained without prejudice to the other specifications of the products under consideration. The examples which follow will make possible a better understanding of the invention and will make it possible to grasp all its advantages and its alternative embodiments thereof.

EXAMPLES

Nota bene: all the refractive indices are given at 25° C.

Example 1

Preparation in a beaker (and using a scraper stirrer) of a mixture of 700 g of POS A1 oil 48 V 135 000 from Rhodia Silicones ((α,ω-dihydroxylated polydimethyl-siloxane silicone oil, viscosity=135 000 mPa.s, assaying approximately 300 ppm of OH by weight, with an index n=1.404), of 14 g of a hydroxylated silicone resin (crosslinking agent D) (Resin 4509 from Rhône-Poulenc, with MDT units and with 0.5% by weight of OH groups, refractive index n=1.4114) and of 140 g of solvent Sa formed of Progilin P155 (alkylbenzene from Chevron, refractive index n=1.4845). The refractive index of the silicone phase $\phi_S$ (or oily mixture) thus prepared is $n_S$=1.4191.

Introduction into a 1.5 litre IKA reactor (equipped with a scraper blade driven by an IKA Eurostar controlvisc P7 motor, the base of which is cooled by circulation of cold water) of 20.6 g of Rhodasurf ROX (surfactant SA) (85% solution of ethoxylated fatty alcohol from Rhodia, the dry matter of which exhibits a refractive index of 1.458) and a first fraction of 29.1 g of filler FI Ludox TM 50 (50% aqueous sol of colloidal silica from Dupont, exhibiting a specific surface of 130 m$^2$/g and a mean particle size of 22 nm). Stirring for 10 minutes at 100 revolutions/min.

Gradual introduction using a dropping funnel with stirring (150 revolutions/min) of the preceding silicone phase $\phi_S$ into the IKA reactor comprising surfactant SA, the silica FI and the water. The total duration of the running in is 6 hours, the temperature varying from 19.6 to 24° C. The oil/water emulsion obtained exhibits a mean particle size of 0.80 μm and a median particle size of 0.73 μm (measurements made with the Coulter LS130 from Coultronics).

The stirring rate is reduced to 100 revolutions/min and a 2nd fraction of Ludox TM 50 (146 g) is run in over 15 min, followed by 68.1 g of demineralized water (dilution water) over 15 min.

The bulk temperature is 24.6° C.

Finally, 28 g of adhesion promoter B' are added. Stirring is carried out for 10 min, 7 g of catalyst C [aqueous emulsion assaying 38% of dioctyltin dilaurate (stabilized with polyvinyl alcohol)] are added and stirring is carried out for a further 10 min.

The promoter B' is an aqueous solution of amine-comprising T(OH) resin prepared by producing a 40% aqueous γ-aminopropyltriethoxysilane solution and then stripping off the ethanol formed by hydrolysis. The solution is perfectly clear and exhibits a solids content of 23%. It is a mixture of oligomers comprising from 4 to 10 silicon and having an NH2 content of 2.9% (±0.3%). A viscosity at 25° C. is 4 cst (±1 cst).

The mastic is then debubbled by stirring for 10 min under a vacuum of 30 mbar and then packaged in a polyethylene container with water vapour excluded. It exhibits a solids content of 84%.

Evaluations

One month after preparation, the mastic is spread over 24/5 contrast cards from Erichsen, comprising a black background and a white background, with a calibrated doctor blade or using frames of calibrated thickness, so as to produce a film with a variable thickness which is left to dry for 30 days in an air conditioned room at 23° C. and at 50% relative humidity. The thickness e of the dry film is measured using a Palmer.

The transparency level is then measured using a Sensor 2 spectrocolorimeter from ACS precalibrated by means of an opaque screen and of white and grey reflecting sheets. After having measured the signal reflected by the film deposited on a white background and then on a black background, the device calculates the covering power of the film defined by the contrast ratio R, which can vary between 0 in the case of completely transparent (non-covering) films and 100% in the case of opaque (completely covering) films. The transmission T is defined by: T=100−R. Nota bene: as the value of R depends on the thickness, several films with a thickness in the vicinity of 2 mm were prepared and the value of R for a thickness of 2 mm is obtained by linear intrapolation of the values measured at the thicknesses closest to 2 mm.

As the concentration by volume C of hydrophilic (anhydrous) species in the dry film is known from the composition of the mixtures, the coefficient of extinction $\epsilon$ can be calculated by measurement of T and of the thickness of the film e, which is given by the expression: $\epsilon$=(log (100/T))/(e.C).

The results are collated in Table 1 below (it should be noted that the value of the coefficient of extinction is in principle independent of the thickness for thicknesses not very different from 2 mm). It will be observed that Table 1 comprises, by way of comparison, the $|n_H-n_S|$ and the $\epsilon$ obtained in Examples 5 and 6 of EP-A-0 542 498.

In the case of the film obtained by drying the aqueous dispersion, the following mechanical properties are also measured (recorded in Table 2 below):

- the Shore A hardness according to Standard ASTM-D 2240,
- the ultimate tensile strength (in MPa) according to Standard AFNOR-T 46 002, corresponding to ASTM-D 412,
- the elongation at break (in %) according to AFNOR-T 46 002,
- the elastic modulus at 100% elongation (in MPa) according to Standard AFNOR-T 46 002.

Example 2

Example 1 is repeated but using 800 g of 48V135000 oil, 16 g of resin 4509 and 240 g of alkylate. The emulsification is carried out with the same method by running the preceding oily mixture, with stirring, into an aqueous mixture composed of 23.5 g of SA (ROX) and 3.2 g of filler FI (Ludox TM50).

The mastic is formulated as in Example 1 but with 166.8 g of filler FI [Ludox (2nd fraction)], 93 g of dilution water, 32 g of promoter B' according to Example 1 and 8 g of catalyst C [tin salt emulsion (Example 1)].

In this example, the refractive index of the silicone phase (H48+resin+alkylate) is 1.425 and the mean particle size of the emulsion is 1 μm (with a median of 1.1 μm). The final solids content of the mastic is 84%.

Example 3 (Counter-Example)

Control Test with POS A1 (Oil 48) without Alkylate $S_A$

Example 1 is repeated without adding Sa (alkylate). The respective amounts are:

- 206.7 g of A1 oil 48V135 000, 2.1 g of resin D 4509, 6.1 g of Rhodasurf ROX and 5.5 g of demineralized water, to produce an emulsion of 1 pm,
- to which are added 51.7 g of FI (Ludox TM50), 6.7 g of dilution water, 13.4 g of promoter B' (identical to that of Example 1) and 0.7 g of catalysing emulsion.

In this example, the refractive index of the silicone phase (POS A1+resin D) is 1.404.

Example 4

500 g of an α,ω-dihydroxylated silicone copolymer with a viscosity of 124 000 mPa.s and composed of 10% by eight of $Ph_2SiO$ units and 90% of $Me_2SiO$ units are introduced into the IKA reactor. 10 g of resin D 4509, 14.7 g of DA (Rhodasurf ROX) and 20.8 g of Ludox TM50 (1st fraction) are added to this copolymer A2 (with an index n=1.4233). In this example, the refractive index of the silicone phase $\phi_S$ (Silicone oil A2+Resin D) is $n_2$=1.4231. The mixture is sheared for 2 hours at 150 rev/min (with circulation of cold water in the base of the reactor), which makes it possible to obtain an oil/water emulsion with a mean particle size of 0.67 μm. During this operation, the bulk temperature rises from 24.8 to 26° C.

104.3 g of FI [Ludox TM50 (2nd fraction)], 29.6 g of demineralized water, 20 g of promoter B' (Example 1) and 5 g of dioctyltin dilaurate emulsion C are added to the emulsion while observing a stirring time of 15 min between each addition and then the mastic is debubbled under vacuum and with moderate stirring (as in Example 1). The solids content of the final mastic is 84%.

Example 5

Example 1 is repeated but replacing the A2 oil 48V1 35000 with 400 g of the silicone copolymer A2 using Example 4, which is mixed with 20 g of resin D 4509 and 90 g of Sa (alkylate). This mixture is emulsified by pouring, with stirring, into a mixture composed of 11.8 g of SA (Rhodasurf ROX) and of 16.6 g of FI [Ludox TM50 (1st fraction)].

In this example, the refractive index of the silicone phase $\phi_S$ (silicone oil+resin+alkylate) is 1.4355 and the mean particle size of the emulsion is 1 μm.

83.4 g of Ludox TM50 OH (2nd fraction), 43.1 g of demineralized water, 16 g of promoter B' (Example 1) and 4 g of dioctyltin dilaurate emulsion C are added to the emulsion. The solids content of the final mastic is 84%.

Example 6

Example 5 is repeated but replacing the silicone copolymer A2 used in Example 5 with 700 g of an α,ω-dihydroxylated silicone copolymer $A_2'$ with a viscosity equal to 12 500 mpa.s and composed of 15% by weight of $Ph_2SiO$ units and 85% of $Me_2SiO$ units (n=1.433), which is mixed with 14 g of resin D 4509 and 140 g of SA alkylate. Emulsification is carried out by running this mixture, with shearing, onto a vessel heel composed of a mixture of 20.6 g of Rhodasurf ROX and of 29.1 g of Ludox TM50 (1st fraction). In this example, the refractive index of the silicone phase $\phi_S$ [silicone oil A2+resin D+Sa (alkylate)] is equal to 1.442 and the mean particle size of the emulsion is 0.74 μm.

146 g of FI [Ludox TM50 (2nd fraction)], 68.1 g of demineralized water, 28 g of promoter B' (Example 1) and 7 g of dioctyltin dilaurate emulsion C are added to the emulsion. The solids content of the final mastic is 84%.

Example 7

Example 5 is repeated but replacing the silicone copolymer A2 used in Example 5 with 800 g of an α,ω-dihydroxylated silicone copolymer A2" with a viscosity equal to 180 000 mpa.s and composed of 15% by weight of MePhSiO units and 85% of $Me_2SiO$ units (n=1.423), which is mixed with 40 g of resin D 4509 and 180 g of Sa (alkylate). This mixture is emulsified by running it, with shearing, onto a mixture composed of 23.5 g of Rhodasurf ROX SA and of 33.2 g of FI [Ludox TM50 (1st fraction)]. In this example, the refractive index $n_S$ of the silicone phase $\phi_S$ [silicone oil A2"+resin D+Sa (alkylate)] is equal to 1.435 and the mean particle size of the emulsion is 1 μm.

166.8 g of FI [Ludox TM50 (2nd fraction)], 86.2 g of demineralized water, 32 g of B' and 8 g of dioctyltin dilaurate emulsion C are added to the emulsion. The solids content of the final mastic is 84%.

Example 8

Preparation of the Emulsion EM1 (without a Filler)

Introduction into the 1.5 litre IKA reactor, equipped with a scraper blade and with cooling by circulation of cold water, of 600 g of POS A2 oil 48 V 135 000 and then of 6 g of the resin D 4509. The refractive index of this silicone mixture at 25° C. is 1.404.

Addition of 33.5 g of nonionic fluorinated surfactant SA (Zonyl FSO 100 from Dupont), the refractive index of which at 23° C. is 1.397.

Addition of 36 g of demineralized water and then kneading for 30 min at 150 revolutions/min and then for 30 minutes at 200 revolutions/min, in order to produce the emulsion by phase inversion and the refining of the particle size. The temperature was maintained at 23° C.

The stirring rate is reduced to 100 revolutions/min and 65.3 g of demineralized water are run in over 15 min with stirring.

The emulsion obtained exhibits a mean particle size of 3.15 µm (measurements made with a Coulter LS1 30 from Coultronics). The bulk temperature is 19.3° C.

The stirring rate is reduced to 60 revolutions/min and 3 g of the aqueous emulsion assaying 38% of dioctyltin dilaurate (stabilized with polyvinyl alcohol) are run in over 5 min with stirring.

The emulsion is debubbled by stirring for 5 min under a vacuum of 30 mbar.

This emulsion EM1 exhibits a solids content of 86%.

Preparation of the Dispersion EM2 (Filler-Comprising Emulsion)

In the same IKA reactor as above, 85 g of Ludox TM50 FI are added to 422.8 g of preceding emulsion EM1 over 5 min with stirring at 60 revolutions/min and then the emulsion is debubbled by stirring for 5 min under a vacuum of 30 mbar and packaged in a polyethylene container with water vapour excluded.

The concentration of dry silica in the emulsion thus obtained (emulsion EM2) is then 8.4% and the solids content of this emulsion EM2 is 80%.

Example 9

The curve $\epsilon = f(|n_H - n_S|)$ given in the appended FIG. 1 was plotted for each of the preceding Examples 1 to 8. $\epsilon$ is defined according to the Lambert-Beer law:

$$\log(1/T) = \epsilon \cdot e \cdot C,$$

where:

C = total fraction by volume of the hydrophilic species in the dry film, e = thickness of the dry film (in nm), T = transmission of the film irradiated with a white light of 400 < λ < 700 nm.

It is apparent that the values $|n_H - n_S| \leq 0.04$ for Examples 1, 2 and 4 to 8 determine an $\epsilon \leq 0.8$, synonymous with high transparency.

On the other hand, Counter-example 3 gives an $|n_H - n_S| \sim 0.567$, corresponding to $\epsilon = 1.848$. The elastomer is not transparent.

Likewise, this FIG. 1 shows the points $\epsilon = f|n_H - n_S|$ which are obtained for Examples 5 and 6 of EP-A-0 542 498.

It is obvious that these points are outside the field of the invention and that the corresponding elastomers are not transparent.

TABLE 1

TRANSPARENCY AND COEFFICIENT OF EXTINCTION OF THE FILMS

| EXAMPLE | REFRACTIVE INDEX SILICONE PHASE $n_S$ | DRY FILM THICKNESS e (mm) | R (%) | TRANSMISSION T (%) | HYDROPHILIC SPECIES CONCENTRATIONS BY VOLUME/ DRY FILM (IN %) | | | | HYDROPHILIC PHASE $n_H$ |
|---|---|---|---|---|---|---|---|---|---|
| | | | | | $C_1$ ($C_{13}E_8$) | $C_2$ ($SiO_2$) | $C_3$ (promoter B) | C $C_1 + C_2 + C_3$ | |
| 1 | 1.4191 | 2 | 19.6 | 80.4 | 1.904 | 3.89 | 0.49 | 6.28 | 1.4579 |
| 2 | 1.4247 | 2 | 17.5 | 82.5 | 1.75 | 2.58 | 0.45 | 5.78 | 1.4579 |
| 3 | 1.4041 | 2 | 49.5 | 50.5 | 2.32 | 4.74 | 0.97 | 8.03 | 1.4608 |
| 4 | 1.4231 | 2 | 21.6 | 78.4 | 2.3 | 4.71 | 0.6 | 7.61 | 1.4579 |
| 5 | 1.4351 | 2 | 9.5 | 90.5 | 1.83 | 3.73 | 0.47 | 6.03 | 1.4579 |
| 6 | 1.4423 | 2 | 9.2 | 90.8 | 1.9 | 3.89 | 0.49 | 6.28 | 1.4579 |
| 7 | 1.4347 | 2 | 10.6 | 89.4 | 1.83 | 3.73 | 0.47 | 6.03 | 1.458 |
| 8 | 1.4041 | 1.5 | 15.6 | 84.4 | 3.34 (zonyl) | 4.73 | 0 | 8.08 | 1.4281 |

| | EXAMPLE | DELTA N $n_H - n_s$ | COEFFICIENT OF EXTINCTION EPSILON |
|---|---|---|---|
| | 1 | 0.0388 | 0.754 |
| | 2 | 0.0332 | 0.722 |
| | 3 | 0.0567 | 1.846 |
| | 4 | 0.0348 | 0.695 |
| | 5 | 0.0228 | 0.359 |
| | 6 | 0.0156 | 0.333 |
| | 7 | 0.0233 | 0.403 |
| | 8 | 0.024 | 0.608 |
| EP 0 542 498 | 5 | 0.0616 | 2.65 |
| EP 0 542 498 | 6 | 0.067 | 1.243 |

TABLE 1-continued

TRANSPARENCY AND COEFFICIENT OF EXTINCTION OF THE FILMS

| CHARAC- TERISTICS | POS A OIL 48 | CROSSLINKING AGENT D RESIN 4509 | FLUORINATED SA ZONYL FSO | SURFACTANT SA dry $C_{13}E_8$ | FI dry $SiO_2$ | PROMOTER B' dry B' | SOLVENT Sa ALKYLATE |
|---|---|---|---|---|---|---|---|
| Density | 1.098 | 1.098 | 1.36 | 0.98 | 2.4 | 1.398 | 0.86 |
| Refractive indices | 1.404 | 1.4114 | 1.397 | 1.458 | 1.45 | 1.52 | 1.4845 |

TABLE 2

MECHANICAL PROPERTIES

| EXAMPLE | UTS (Mpa) | EB (%) | Mod. 100% (Mpa) | Hardness (Sh. A) |
|---|---|---|---|---|
| 1 | 0.34 | 235 | 0.19 | 13 |
| 2 | 0.29 | 276 | 0.13 | 10 |
| 3 | 0.44 | 274 | 0.21 | 15 |
| 4 | | | | |
| 5 | | | | |
| 6 | 0.16 | 112 | 0.14 | 11 |
| 7 | 0.33 | 265 | 0.14 | 11 |
| 8 | 0.54 | 326 | 0.31 | 15 |

What is claimed is:

1. An aqueous silicone dispersion capable of being crosslinked into a transparent elastomer comprising:
    (i) a silicone phase $\phi_S$ with a refractive index $n_S$ comprising:
        at least one crosslinkable polyorganosiloxane (POS) A,
        optionally at least one silicon-comprising adhesion promoter B,
        optionally at last one crosslinking agent D, with the proviso that at least one of the constituents A, B or D of $\phi_S$ carries at least three crosslinking functional groups per molecule,
        and optionally at least one solvent $S_a$ of the POS A silicone(s),
    (ii) a non-silicone hydrophilic phase $\phi_H$ with a refractive index $n_H$ comprising at least one filler FI, a surfactant SA and optionally at least one catalyst and/or at least one water-soluble adhesion promoter B',
    (iii) and water, wherein:

$|n_S - n_H| \leq 0.05.$

2. A dispersion as claimed in claim 1, which is capable of being converted into a transparent elastomer, this conversion being accompanied by elimination of water.

3. A dispersion as claimed in claim 1, wherein:
    the POS A is a polydiorganosiloxane oil having, per molecule, at least two condensable or hydrolysable ≡SiOR$^a$ groups with R$^a$=H or alkyl;
    the POS A is capable of being crosslinked by condensation or hydrolysis/condensation, optionally in the presence of a condensation catalyst C; and,
    the optional crosslinking agent D comprises at least one hydroxylated and/or alkoxylated silicone resin and optionally at least one alkoxysilane E which reacts to provide the ≡SiOR$^a$ ends of the POS A.

4. A dispersion as claimed in claim 1, which comprises at least one POS A1 with a refractive index $n_{A1}$ such that $|n_{A1} - n_H| > 0.04$, wherein the POS A1 is used in combination with at least one agent for enhancing the $n_S$ selected from the solvents $S_a$ of the POS A1, this enhancing agent being present in proportions such that it is miscible with $\phi_S$.

5. A dispersion as claimed in claim 1, which comprises at least one POS A2 diorganosiloxane copolymer with a refractive index $n_{A2}$ such that $|n_{A2} - n_H| \leq 0.04$.

6. A dispersion as claimed in claim 5, wherein the POS A2 defined by $|n_{A2} - n_H| \leq 0.04$ is used in combination with at least one agent for enhancing the $n_S$ selected from the solvents $S_a$ of the POS A2, this enhancing agent being present in proportions such that it is miscible with $\phi_S$.

7. A dispersion as claimed in claim 3, which comprises at least one POS A1 with a refractive index $n_{A1}$ such that $|n_{A1} - n_H| \leq 0.04$ and at least one POS A2 with a refractive index $n_{A2}$ such that $|n_{A2} - n_H| \leq 0.04$ and in that POS A1 and POS A2 are at least partially miscible with one another.

8. A dispersion as claimed in claim 7, which comprises at least one agent for enhancing the $n_S$ selected from solvents S common to POS A1 and to POS A2, this enhancing agent being present in proportions such that it is miscible with $\phi_S$.

9. A dispersion as claimed in claim 1, wherein $\phi_H$ comprises at least one surfactant SA selected from ionic, nonionic, amphoteric fluorinated surfactants and their mixtures.

10. A dispersion as claimed in claim 9, wherein the concentration of SA, expressed as % by weight with respect to $\phi_H$, is as follows:

$0.5 \leq [SA] \leq 10.$

11. A dispersion as claimed in claim 1, having the following composition, in parts by weight on a dry basis:
    100 parts by weight of at least one POS A1 α,ω-dihydroxylated polydimethylsiloxane silicone oil, or
    of at least one POS A2 α,ω-dihydroxylated copolymer silicone oil:
        with dimethylsiloxane units and diphenylsiloxane units,
        with methyl(alkylstyryl)siloxane units and dimethylsiloxane units,
        with methyloctylsiloxane or methyldodecylsiloxane units and dimethylsiloxane units, or
        with methylphenylsiloxane units and dimethylsiloxane units;
    0 to 10 parts by weight of at least one adhesion promoter B and/or B' chosen from amine-containing silicone resins or oligomers comprising D, T and/or Q, optionally M, siloxyl units, at least part of the D, T or M units carrying one or more amine functionalities (D(N) and/or T(N) and/or M(N),
    hydroxylated linear POSs hydroxylated silicone resins or mixtures thereof;
    0 to 10 parts by weight of at least one crosslinking agent D chosen:
        from hydroxylated silicone resins or mixtures thereof, these resins having silicons substituted by vinyl and/or phenyl and/or 3,3,3-trifluoropropyl and/or linear or branched $C_1$–$C_6$ alkyl radicals, or silicas;
    0 to 5 parts by weight of at least one alkoxysilane E of formula $R^b_{3-t}Si(OR^a)_t$ with $R^a$=H or alkyl, $R^b$=optionally substituted $C_1$–$C_6$ (cyclo)alkyl or alkenyl and t=1, 2 or 3;

0 to 30 parts by weight of at least one solvent $S^a$ of the POS A;

0 to 2 parts by weight of at least one condensation catalyst C;

0.5 to 10 parts by weight of at least one surfactant SA;

2 to 20 parts by weight of at least one siliceous filler FI selected from precipitated or non-precipitated silica, colloidal or powdered silica or mixtures thereof;

with the proviso that at least one of the components D, B, B' or E is present in the composition.

12. A dispersion as claimed in claim 1, which additionally comprises at least one dispersing agent F and/or at least one plasticizer G and/or at least one fungicidal agent H and/or at least one antifoaming agent I and/or at least one stabilizing or thickening agent J and/or at least one base K and/or one pigment or inorganic or organic dye L.

13. A dispersion as claimed in claim 1, which comprises droplets of dispersed silicone phase $\phi_S$ provided in an at least partially crosslinked form.

14. A process for the preparation of the dispersion as claimed in claim 1, comprising producing an emulsion of at least a portion of the silicone phase $\phi_S$ in an aqueous phase comprising at least a portion of the hydrophilic phase $\phi_H$ and water using mechanical stirring means.

15. An at least partially crosslinked silicone elastomer obtained from the dispersion as claimed in claim 1.

16. A mastic, leakproofing and/or water-repelling material or film, paint or coating, forming from the dispersion as claimed in claim 1.

17. A dispersion as claimed in claim 11, wherein said adhesion promoter is a hydroxylated silicone resin selected from T(OH), DT(OH), DQ(OH), DT(OH), MQ(OH), MDT (OH), MDQ(OH), or mixtures thereof.

18. A dispersion as claimed in claim 11, wherein said crosslinking agent is a hydroxylated silicone resin selected from T(OH), DT(OH), DQ(OH), DT(OH), MQ(OH), MDT (OH), MDQ(OH), or mixtures thereof.

19. A dispersion as claimed in claim 9, wherein the at least one surfactant SA is selected from the group consisting of:

perfluoroalkyls, perfluorobetaines, ethoxylated polyfluoroalcohols, surface-active agents, the hydrophilic part of which comprises one or more saccharide units(s) carrying from five to six carbon atoms and the hydrophobic part of which comprises a unit of formula Rf(CH$_2$)$_n$—, in which n=2 to 20 and Rf represents a perfluoroalkyl unit of formula $C_mF_{2m+1}$, in which m=1 to 10; and polyelectrolytes exhibiting fatty perfluoralkyl side groups;

SA having a refractive index $n_{SA} \leq 1.5$.

* * * * *